United States Patent
Oh et al.

(10) Patent No.: US 8,333,815 B2
(45) Date of Patent: Dec. 18, 2012

(54) CERIUM OXIDE POWDER FOR ABRASIVE AND CMP SLURRY COMPRISING THE SAME

(75) Inventors: Myoung-Hwan Oh, Daejeon (KR); Seung-Beom Cho, Daejeon (KR); Jun-Seok Nho, Daejeon (KR); Jong-Pil Kim, Daejeon (KR); Jang-Yul Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 349 days.

(21) Appl. No.: 12/598,666

(22) PCT Filed: Apr. 30, 2008

(86) PCT No.: PCT/KR2008/002460
§ 371 (c)(1),
(2), (4) Date: Nov. 3, 2009

(87) PCT Pub. No.: WO2008/136593
PCT Pub. Date: Nov. 13, 2008

(65) Prior Publication Data
US 2010/0062687 A1     Mar. 11, 2010

(30) Foreign Application Priority Data
May 3, 2007   (KR) .................. 10-2007-0043156

(51) Int. Cl.
B24D 3/02 (2006.01)
C09C 1/68 (2006.01)
C09K 3/14 (2006.01)
H01L 21/302 (2006.01)
H01L 21/461 (2006.01)

(52) U.S. Cl. ........................... 51/309; 438/689

(58) Field of Classification Search ............... 51/307, 51/309; 438/689
See application file for complete search history.

(56) References Cited

U.S. PATENT DOCUMENTS
2004/0147206 A1 * 7/2004 Akahori et al. ........... 451/41
2006/0124591 A1   6/2006 Haga et al.
2007/0079559 A1 * 4/2007 Oh et al. ................. 51/309

FOREIGN PATENT DOCUMENTS

| KR | 10-0682231 B1 | 2/2007 |
| KR | 10-0786961 B1 | 12/2007 |
| KR | 10-0812052 B1 | 3/2008 |
| WO | 2004/015021 A1 | 2/2004 |
| WO | 2008136593 A1 | 11/2008 |

OTHER PUBLICATIONS

Notice of Allowance issued on May 17, 2010, by Korean Patent Office in corresponding Korean application No. 10-2008-0041787, 2 pages.

* cited by examiner

*Primary Examiner* — Pegah Parvini
(74) *Attorney, Agent, or Firm* — Rothwell, Figg, Ernst & Manbeck, P.C.

(57) ABSTRACT

Disclosed are cerium oxide powder for an abrasive; CMP slurry including the same; and a shallow trench isolation (STI) process using the CMP slurry. At least two kinds of cerium oxides prepared by using cerium carbonates having different crystal structures are mixed in an appropriate ratio and used as an abrasive for CMP slurry, thereby adjusting required polishing properties of the CMP slurry. Also, in a disclosed method of preparing a cerium carbonate, the crystal structure of the cerium carbonate can be easily controlled. Based on the finding that in a cerium oxide for an abrasive, the kind of improved polishing property depends on the crystal structure of a cerium carbonate, at least one from among polishing properties, such as the polishing rate of a silicon oxide layer, the polishing rate of a silicon nitride layer, the polishing selectivity between the silicon oxide layer and the silicon nitride layer, and WIWNU, can be adjusted by using at least two kinds of cerium oxides selected from the group including (i) a cerium oxide prepared by using a lanthanite-(Ce) crystal structured cerium carbonate, (ii) a cerium oxide prepared by using an orthorhombic crystal structured cerium carbonate, and (iii) a cerium oxide prepared by using a hexagonal crystal structured cerium carbonate, as an abrasive for CMP slurry, and adjusting the mixing ratio of the cerium oxides.

8 Claims, 4 Drawing Sheets

CERIUM OXIDE POWDER FOR ABRASIVE AND CMP SLURRY COMPRISING THE SAME

CROSS REFERENCE TO RELATED APPLICATIONS

This application is a 35 U.S.C. §371 National Phase Entry Application from PCT/KR2008/002460, filed Apr. 30, 2008, and designating the United States, which claims priority under 35 U.S.C. §119 to Korean Patent Application No. 10-2007-0043156 filed May 3, 2007, which is incorporated herein in its entirety.

TECHNICAL FIELD

The present invention relates to cerium oxide powder for an abrasive, which allows polishing properties to be efficiently adjusted, CMP slurry including the same, and a shallow trench isolation (STI) process using the CMP slurry.

Also, the present invention relates to a method of preparing a cerium carbonate, in which a crystal structure of the cerium carbonate can be easily controlled.

BACKGROUND ART

In general, there has been a tendency to increase the diameter of a wafer in current semiconductor fabrication processes so as to accomplish high integration of a ULSI (ultralarge scale integrated circuit). Also, current semiconductor fabrication has been subjected to more strict standards including the minimum width requirement of 0.13 μm or less. Further, a step of forming a multiple interconnection or multilayer interconnection structure on a wafer is essentially required for improving the quality of a semiconductor device. However, non-planarization of wafer occurring after carrying out one of the above techniques causes many problems, such as a drop in the margin in the subsequent steps or degradation of the quality of a transistor or device. Therefore, planarization processes have been applied to various steps so as to solve such problems.

One of these planarization techniques is CMP (chemical mechanical polishing). During the process of CMP, a wafer surface is pressed against a polishing pad that rotates relative to the surface, and chemically reactive slurry is introduced onto the wafer surface having a pattern, thereby accomplishing planarization of the wafer surface.

Such a CMP technique may be applied to a shallow trench isolation (STI) process, and particularly in a step of polishing an insulating silicon oxide layer 104 until a silicon nitride etch-stop layer 102 is exposed, after depositing the insulating silicon oxide layer 104, so that a trench 103 on a wafer may be embedded therein (see (b) and (c) in FIG. 1). Herein, in order to improve polishing efficiency, selective polishing characteristics between the silicon oxide layer and the silicon nitride layer (the ratio of the polishing rate of the silicon nitride layer to the polishing rate of the silicon oxide layer, hereinafter, referred to as 'polishing selectivity') is required to be increased, and also, in order to increase the planarization degree of the whole wafer, the polishing rate of the silicon oxide layer and the polishing rate of the silicon nitride layer are required to be appropriately controlled.

Accordingly, research on control of highly increasing the polishing rate of the silicon oxide layer to the polishing rate of the silicon nitrate layer has been conventionally carried out so as to increase polishing efficiency and to improve planarization of the whole wafer. However, a great deal of such research has been conducted on a chemical method of varying the composition of CMP slurry, while research on improvement of a polishing quality through adjustment of an abrasive's own physical property has been hardly carried out.

DISCLOSURE

Technical Problem

Therefore, the present invention has been made in view of the above-mentioned problems. The inventors of the present invention have found that in a cerium oxide for an abrasive, the kind of improved polishing property depends on the crystal structure of a cerium carbonate (which is a source material). In the present invention, based on this finding, at least two kinds of cerium oxides prepared by using cerium carbonates having different crystal structures are mixed in an appropriate ratio and used as an abrasive for CMP slurry, thereby adjusting required polishing properties from among properties such as the polishing rate of a silicon oxide layer, the polishing rate of a silicon nitride layer, polishing selectivity between the silicon oxide layer and the silicon nitride layer, and within-wafer non-uniformity (WIWNU), and improving the polishing quality of CMP slurry.

Also, the present inventors have found that in preparation of a cerium carbonate through mixing and a precipitation reaction of a cerium precursor aqueous solution and a carbonate precursor aqueous solution, the crystal structure of a formed cerium carbonate varies according to cerium concentration in the cerium precursor aqueous solution and/or temperature of the precipitation reaction. Based on this finding, the present invention provides a method of preparing a cerium carbonate, in which the crystal structure of the cerium carbonate can be easily controlled.

Technical Solution

According to an aspect of the present invention, there is provided CMP slurry including at least two kinds of cerium oxides selected from the group including (i) a cerium oxide prepared by using a lanthanite-(Ce) crystal structured cerium carbonate; (ii) a cerium oxide prepared by using an orthorhombic crystal structured cerium carbonate; and (iii) a cerium oxide prepared by using a hexagonal crystal structured cerium carbonate, as an abrasive, and a shallow trench isolation (STI) process using the CMP slurry According to another aspect of the present invention, there is provided cerium oxide powder for an abrasive, which includes at least two kinds of cerium oxides selected from the group including (i) a cerium oxide prepared by using a lanthanite-(Ce) crystal structured cerium carbonate; (ii) a cerium oxide prepared by using an orthorhombic crystal structured cerium carbonate; and (iii) a cerium oxide prepared by using a hexagonal crystal structured cerium carbonate.

According to a further aspect of the present invention, there is provided a method of preparing a cerium carbonate by carrying out mixing and a precipitation reaction of an aqueous solution of a cerium precursor and an aqueous solution of a carbonate precursor, wherein the cerium carbonate is controlled to have a lanthanite-(Ce) crystal structure, an orthorhombic crystal structure, or a hexagonal crystal structure by adjusting cerium concentration of the aqueous solution of the cerium precursor within a range of 0.01 to 10M, or by adjusting temperature of the precipitation reaction within a range of 0 to 99° C.

According to a still further aspect of the present invention, there is provided a method of adjusting at least one from among polishing properties, such as a polishing rate of a silicon oxide layer, a polishing rate of a silicon nitride layer, polishing selectivity between the silicon oxide layer and the silicon nitride layer, and within-wafer non-uniformity (WIWNU), by using at least two kinds of cerium oxides selected from the group including (i) a cerium oxide prepared by using a lanthanite-(Ce) crystal structured cerium carbonate; (ii) a cerium oxide prepared by using an orthorhombic crystal structured cerium carbonate; and (iii) a cerium oxide prepared by using a hexagonal crystal structured cerium carbonate, as an abrasive for CMP slurry.

Hereinafter, the present invention will be explained in more detail.

In general, CMP slurry includes an abrasive, a dispersant and water.

Meanwhile, in an STI process, a surface subjected to polishing in a CMP step, that is, an insulating silicon oxide layer and a silicon nitride etch-stop layer, has different properties. In other words, while the insulating silicon oxide layer has low strength and high chemical reactivity with a cerium oxide, the silicon nitride etch-stop layer has lower chemical reactivity with the cerium oxide as compared to the insulating silicon oxide layer, and strength at least three times higher than that of the insulating silicon oxide layer. Accordingly, through chemical mechanical polishing, it is easy to remove the insulating silicon oxide layer, but it is difficult to remove the silicon nitride etch-stop layer.

However, despite such physical/chemical differences of a surface subjected to polishing, conventionally used CMP slurry has polishing selectivity between a silicon oxide layer and a silicon nitride layer of about 4:1. Hence, the silicon nitride etch-stop layer is polished to a degree exceeding the acceptable range in a practical CMP process. As a result, the silicon nitride layer pattern may be removed non-uniformly depending on locations in a wafer during a CMP process. Therefore, the silicon nitride etch-stop layer has a significantly variable thickness over the whole wafer. During an STI process, this causes a level difference between active regions and field regions in a final structure having a trench formed thereon, resulting in a drop in the process margin of the subsequent steps for manufacturing a semiconductor device, and degradation of the quality of a transistor and a device. Particularly, this is a serious problem in the case of a semiconductor wafer that has patterns having different densities at the same time.

In order to solve the aforementioned problems, a method is required, in which the polishing rate of a silicon oxide layer and the polishing rate of a silicon nitride layer are effectively controlled, thereby increasing polishing efficiency, and also the polishing selectivity between the silicon oxide layer and the silicon nitride layer and within-wafer non-uniformity (WIWNU) of a wafer are improved.

Accordingly, as a method of adjusting the polishing rate of a silicon oxide layer to be higher than the polishing rate of a silicon nitride layer, a chemical method in which an anionic polymer is used as a dispersant for CMP slurry has been conventionally provided.

However, due to the above described physical/chemical differences of a surface subjected to polishing, while the silicon oxide layer can be polished by both chemical polishing and mechanical polishing, the silicon nitride layer can be polished by only mechanical polishing. Therefore, in order to control polishing properties, such as the polishing rate of the silicon oxide layer, the polishing rate of the silicon nitride layer, the polishing selectivity between the silicon oxide layer and the silicon nitride layer, WIWNU, etc., research on an abrasive's own property that affects both chemical/mechanical polishing is required to be firstly conducted.

Therefore, in the present invention, based on the finding that in a cerium oxide for an abrasive, the kind of improved polishing property depends on the crystal structure of a cerium carbonate (which is a source material), at least two kinds of cerium oxides prepared by using cerium carbonates having different crystal structures are mixed in an appropriate ratio and used as an abrasive for CMP slurry, thereby adjusting polishing properties of the CMP slurry.

A cerium oxide which has been recently in the limelight as an abrasive for CMP slurry may be prepared by using several methods, such as a liquid phase method of directly preparing a cerium oxide by adding a pH adjuster to a trivalent or tetravalent cerium starting material, a solid phase method of preparing a cerium oxide by preparing an intermediate source material such as a cerium carbonate and carrying out a high temperature calcination step, etc. In the case of the solid phase method, the shape or strength of the cerium oxide is significantly affected by the crystal structure of a cerium carbonate (a source material).

Also, polishing properties of CMP slurry including a cerium oxide as an abrasive vary according to the shape, strength, particle size, oxidation properties, etc. of the cerium oxide. Thus, the polishing properties of the CMP slurry may be changed according to the crystal structure of a cerium carbonate, that is, a source material of the cerium oxide for the abrasive.

For example, 1) a cerium oxide prepared by using a lanthanite-(Ce) crystal structured cerium carbonate has a plate-like shape in which grains are bound together through a weak bond, which can helpfully act on mechanical polishing of a silicon oxide layer. In other words, the cerium oxide has a high polishing rate to a surface subjected to polishing due to a wide contact area with the surface subjected to polishing, and thus the grains can be easily broken by a mechanical force of a polishing pad. Therefore, the cerium oxide may be disadvantageous for mechanical polishing of a silicon nitride layer having high strength, but may be advantageous for mechanical polishing of a silicon oxide layer having low strength.

2) a cerium oxide prepared by using an orthorhombic crystal structured cerium carbonate has a stick-like shape or a needle-like shape, and has high strength and hardness. Thus, when used as an abrasive, the cerium oxide is not easily broken by a mechanical force of a polishing pad. Also, even though the cerium oxide is broken, the shape of the cerium oxide changes to a sharp needle-like shape, and thus can be advantageous for mechanical polishing of a silicon nitride layer having high strength.

3) a cerium oxide prepared by using a hexagonal crystal structured cerium carbonate has a broad pore distribution, and shows excellent chemical surface activity. Thus, when the cerium oxide is used as an abrasive, the chemical polishing rate of a silicon oxide layer is increased, and thus it is possible to achieve excellent polishing selectivity between the silicon oxide layer and a silicon nitride layer. Also, the cerium oxide has a shape where grains are bound together through a weak bond, and herein, the grains have very uniform sizes. Accordingly, when the cerium oxide is used as an abrasive, the grains are broken into same sized segments by a mechanical force of a polishing pad and polish a surface subjected to polishing. Thus, it is possible to achieve excellent WIWNU over the whole wafer.

In the present invention, based on the fact that in a cerium oxide for an abrasive, the kind of improved polishing property depends on the crystal structure of a cerium carbonate (which is a source material), at least two kinds of cerium oxides prepared by using cerium carbonates having different crystal structures are used as an abrasive for CMP slurry, thereby improving the polishing quality of the CMP slurry.

In other words, at least one from among polishing properties, such as the polishing rate of a silicon oxide layer, the polishing rate of a silicon nitride layer, the polishing selectivity between the silicon oxide layer and the silicon nitride layer, and WIWNU, can be adjusted by using at least two kinds of cerium oxides selected from the group including (i) a cerium oxide prepared by using a lanthanite-(Ce) crystal structured cerium carbonate, (ii) a cerium oxide prepared by using an orthorhombic crystal structured cerium carbonate, and (iii) a cerium oxide prepared by using a hexagonal crystal structured cerium carbonate, as an abrasive for CMP slurry, and adjusting the mixing ratio of the cerium oxides.

Specifically, in cerium oxide powder for the abrasive, the polishing rate of the silicon oxide layer may be increased by increasing the content of the cerium oxide prepared by using the lanthanite-(Ce) crystal structured cerium carbonate; the polishing rate of the silicon nitride layer may be increased by increasing the content of the cerium oxide prepared by using the orthorhombic crystal structured cerium carbonate; or the polishing selectivity between the silicon oxide layer and the silicon nitride layer, and the WIWNU may be increased by increasing the content of the cerium oxide prepared by using the hexagonal crystal structured cerium carbonate.

Herein, in order to increase the polishing rate of the silicon oxide layer, the cerium oxide prepared by using the lanthanite-(Ce) crystal structured cerium carbonate is preferably used in an amount of 50 parts or more and less than 100 parts by weight per 100 parts by weight of the cerium oxide powder for the abrasive; in order to increase the polishing rate of the silicon nitride layer, the cerium oxide prepared by using the orthorhombic crystal structured cerium carbonate is preferably used in an amount of 50 parts or more and less than 100 parts by weight per 100 parts by weight of the cerium oxide powder for the abrasive; and in order to increase the polishing selectivity between the silicon oxide layer and the silicon nitride layer, or the WIWNU, the cerium oxide prepared by using the hexagonal crystal structured cerium carbonate is preferably used in an amount of 50 parts or more and less than 100 parts by weight per 100 parts by weight of the cerium oxide powder for the abrasive.

Meanwhile, the CMP slurry according to the present invention may be prepared by dispersing the cerium oxide powder for the abrasive, together with a dispersant, in water.

The cerium oxide powder for the abrasive of the slurry is preferably used in an amount of 0.1~50 parts by weight per 100 parts by weight of the slurry. If the abrasive, cerium oxide powder, is used in an amount of less than 0.1 parts by weight, it is difficult to polish a surface subjected to polishing. If the cerium oxide powder is used in an amount of greater than 50 parts by weight, stability of the slurry decreases.

The dispersant that may be used in the present invention includes a non-ionic polymeric dispersant or an anionic polymeric dispersant. The non-ionic polymeric dispersant includes at least one compound selected from the group consisting of polyvinyl alcohol (PVA), ethylene glycol (EG), glycerin, polyethylene glycol (PEG), polypropylene glycol (PPG) and polyvinyl pyrrolidone (PVP). The anionic polymeric dispersant includes at least one compound selected from the group consisting of polyacrylic acid, ammonium polyacrylate and polyacrylmaleic acid. However, the scope of the present invention is not limited thereto.

The dispersant is preferably used in an amount of 0.5 to 10 parts by weight per 100 parts by weight of the cerium oxide powder for the abrasive. If the dispersant is used in an amount of less than 0.5 parts by weight, the slurry has lower dispersibility and causes rapid precipitation. Thus, the abrasive cannot be supplied uniformly while the polishing slurry is conveyed due to such precipitation (solid-liquid separation). If the dispersant is used in an amount of greater than 10 parts by weight, a thick dispersant layer acting as a cushion is formed in the vicinity of abrasive particles, and thus the surface of the abrasive is difficult to contact the surface subjected to polishing, thereby reducing the polishing rate.

Preferably, the CMP slurry is titrated to pH 6~8 after the cerium oxide powder and the dispersant are mixed with water. For the titration, 1N KOH or 1N $HNO_3$ may be used.

After the completion of the titration, it is preferable to perform a dispersion stabilization step to improve the dispersion stability and shelf stability of the CMP slurry. The dispersion stabilization step is preferably performed via a wet crushing/dispersion process capable of controlling the particle size finely and accurately. Such processes include a ball mill process, attrition mill process, or the like.

Herein, in the finally formed CMP slurry obtained after the dispersion stabilization step, the cerium oxide powder for the abrasive preferably has a maximum particle size of less than 3 μm and an average particle diameter of 50~1,000 nm. If the cerium oxide powder has an average particle diameter of less than 50 nm, the polishing rate of the surface subjected to polishing is too low. If the cerium oxide powder has an average particle diameter of greater than 1,000 nm, the surface causes micro-scratches, or the slurry has low shelf stability. The above particle size is measured by using a particle size distribution measuring system (Horiba LA-910).

Meanwhile, the CMP slurry according to the present invention may include other additives in order to improve the polishing quality or dispersibility of the slurry.

Also, the present invention provides cerium oxide powder for an abrasive, which includes at least two kinds of cerium oxides selected from the group including (i) a cerium oxide prepared by using a lanthanite-(Ce) crystal structured cerium carbonate; (ii) a cerium oxide prepared by using an orthorhombic crystal structured cerium carbonate; and (iii) a cerium oxide prepared by using a hexagonal crystal structured cerium carbonate.

The cerium oxide powder for the abrasive may be prepared (a) by calcinating cerium carbonate powder including at least two kinds of cerium carbonates selected from the group including a lanthanite-(Ce) crystal structured cerium carbonate, an orthorhombic crystal structured cerium carbonate, and a hexagonal crystal structured cerium carbonate; or (b) by mixing at least two kinds of cerium oxides selected from the group including a cerium oxide prepared by calcinating a lanthanite-(Ce) crystal structured cerium carbonate; a cerium oxide prepared by calcinating an orthorhombic crystal structured cerium carbonate; and a cerium oxide prepared by calcinating a hexagonal crystal structured cerium carbonate.

Herein, the temperature of the calcination may be within a range of 400 to 1200° C., and in the case of the method (b), the calcination temperature may be changed according to the kind of cerium oxide. Although the calcination step may be carried out in the air, calcination under an oxygen atmosphere is preferred.

Meanwhile, the cerium carbonates having the lanthanite-(Ce), orthorhombic, or hexagonal crystal structures may be prepared by carrying out a precipitation reaction between a cerium precursor aqueous solution and a carbonate precursor aqueous solution. According to Examples of the present invention, the crystal structure of a formed cerium carbonate depends on cerium concentration in the cerium precursor aqueous solution and/or temperature of the precipitation reaction:

1) a lanthanite-(Ce) crystal structured cerium carbonate is a cerium carbonate compound represented by $Ce_2(CO_3)_3 \cdot H_2O$, which may be prepared by using a cerium precursor aqueous solution with cerium concentration of 0.01 to 2.2M and adjusting reaction temperature within a range of 0 to 30° C. in the precipitation reaction;

2) an orthorhombic crystal structured cerium carbonate is a cerium carbonate compound represented by $Ce_2O(CO_3)_2 \cdot H_2O$, which is assumed to be formed through the reaction of the following Formula 1 and may be prepared by using a cerium precursor aqueous solution with cerium concentration of 1 to 10M and adjusting reaction temperature within a range of greater than 30° C. and 99° C. or less in the precipitation reaction;

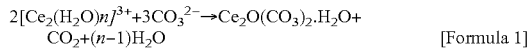

[Formula 1]

3) a hexagonal crystal structured cerium carbonate is a cerium carbonate compound represented by $Ce(OH)CO_3$, which is assumed to be formed through the reaction of the following Formula 2 and may be prepared by using a cerium precursor aqueous solution with cerium concentration of 0.01 to 1M and adjusting reaction temperature within a range of greater than 30° C. and 99° C. or less in the precipitation reaction;

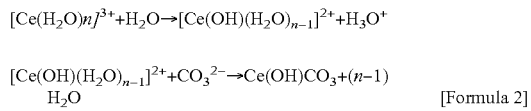

[Formula 2]

Accordingly, in the present invention, each of a lanthanite-(Ce) crystal structured cerium carbonate, an orthorhombic crystal structured cerium carbonate, and a hexagonal crystal structured cerium carbonate may be prepared by carrying out a precipitation reaction between a cerium precursor aqueous solution and a carbonate precursor aqueous solution, and varying cerium concentration in the cerium precursor aqueous solution and/or temperature of the precipitation reaction. Also, cerium carbonate powder including at least two kinds of cerium carbonates selected from the group including a lanthanite-(Ce) crystal structured cerium carbonate, an orthorhombic crystal structured cerium carbonate, and a hexagonal crystal structured cerium carbonate may be prepared by varying cerium concentration in the cerium precursor aqueous solution and/or temperature of the precipitation reaction with time in a continuous reactor.

In the precipitation reaction, a cerium precursor is not particularly limited as long as the cerium precursor is a cerium containing compound. As the cerium precursor, cerium salt including trivalent or tetravalent cerium salt may be used. Non-limiting examples of the cerium salt includes cerium nitrate $(Ce(NO_3)_3 \cdot xH_2O)$, cerium sulfate$(Ce(SO_4)_3 \cdot x H_2O)$, $Ce(SO_4)_2 \cdot xH_2O)$, cerium chloride$(CeCl_3 \cdot xH_2O)$, diammonium cerium nitrate$(Ce(NH_4)_2(NO_3)_6)$, diammonium cerium nitrate hydrate$(Ce(NH_4)_2(NO_3)_5 \cdot xH_2O)$, etc. (herein, x is a constant between 0 to 10).

Also, a carbonate precursor provides carbonate ions $(CO_3^{2-})$, and may act as a pH adjuster. Carbonate, carbonated water, or oxalate may be used as the carbonate precursor. In the present invention, ammonium carbonate is preferred.

Also, in the precipitation reaction, a molar concentration ratio of the cerium precursor to the carbonate precursor is preferably within a range of 1:0.1 to 1:20. If the concentration of the carbonate precursor is low, the yield of a cerium carbonate may decrease. If the concentration of the carbonate precursor is high, a reaction becomes intense, and thus intense boiling occurs.

It is preferable that the precipitation reaction is performed for 30 minutes to 60 hours. If the time for precipitation reaction is excessively prolonged, the precipitation reaction may be excessively performed, and thus it may be difficult to prepare a cerium carbonate into a required crystal structure.

Also, preferably, the cerium carbonate as prepared above is subjected to centrifugal cleaning, and drying at about 60° C. for 24 hours.

Furthermore, the present invention provides a shallow trench isolation (STI) process using the aforementioned CMP slurry. The STI process may be performed according to a process currently used in the art.

Also, the present invention provides a method of adjusting at least one from among polishing properties, such as the polishing rate of a silicon oxide layer, the polishing rate of a silicon nitride layer, the polishing selectivity between the silicon oxide layer and the silicon nitride layer, and WIWNU, by using at least two kinds of cerium oxides selected from the group including (i) a cerium oxide prepared by using a lanthanite-(Ce) crystal structured cerium carbonate, (ii) a cerium oxide prepared by using an orthorhombic crystal structured cerium carbonate, and (iii) a cerium oxide prepared by using a hexagonal crystal structured cerium carbonate, as an abrasive for CMP slurry. Herein, it is possible to make more detailed adjustments at least one of the aforementioned polishing properties by adjusting a mixing ratio of at least two kinds of cerium oxides in the abrasive.

BRIEF DESCRIPTION OF THE DRAWINGS

The foregoing and other objects, features and advantages of the present invention will become more apparent from the following detailed description when taken in conjunction with the accompanying drawings in which.

MODE FOR INVENTION

Reference will now be made in detail to the preferred embodiments of the present invention. However, the follow ing examples are illustrative only, and the scope of the present invention is not limited thereto.

<Preparation of Cerium Carbonate and Cerium Oxide>

EXAMPLE 1

A solution in which cerium nitrate of 1.9M was dissolved in distilled water, and another solution in which ammonium carbonate of 2M was dissolved in distilled water, were prepared. Then, the two solutions were mixed and were subjected to a precipitation reaction at 30° C. for 12 hours.

Figure 1:
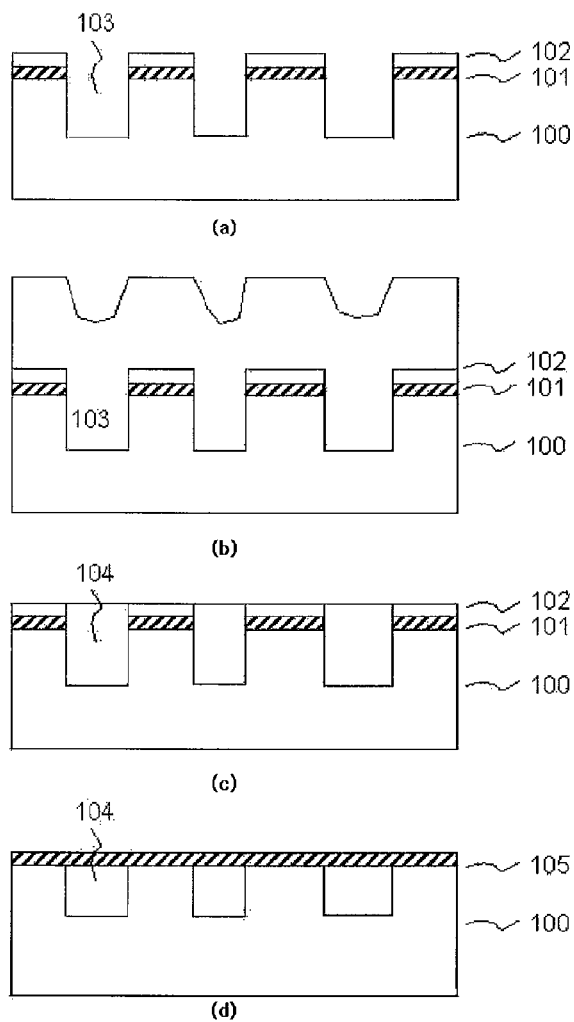
FIG. 1 is a schematic view showing a conventional shallow trench isolation (STI) process:
  100: a semiconductor wafer
  101: a nitride oxide layer
  102: a silicon nitride etch-stop layer
  103: a trench
  104: an insulating silicon oxide layer
  105: a gate silicon oxide layer
Figure 2:
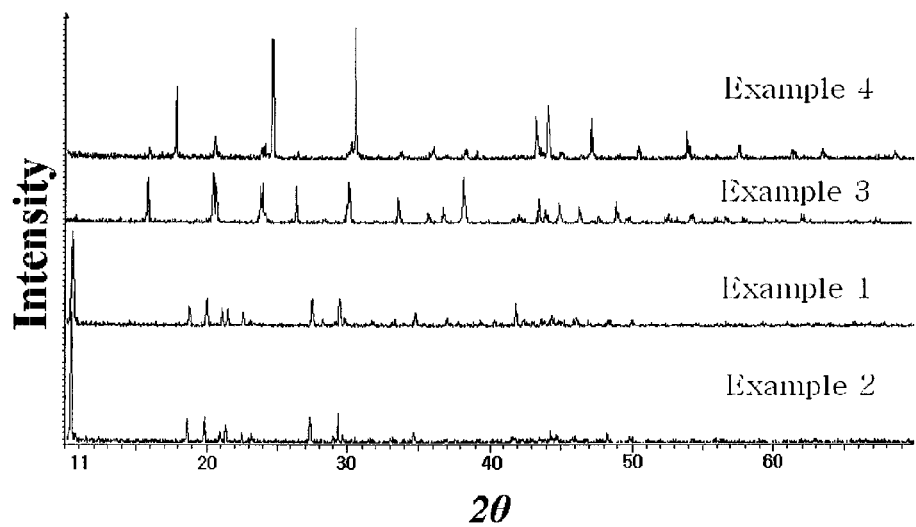
FIG. 2 is the X-ray diffraction (XRD) diagram of the cerium carbonates obtained according to the Examples 1, 5, and 7.
Figure 4:
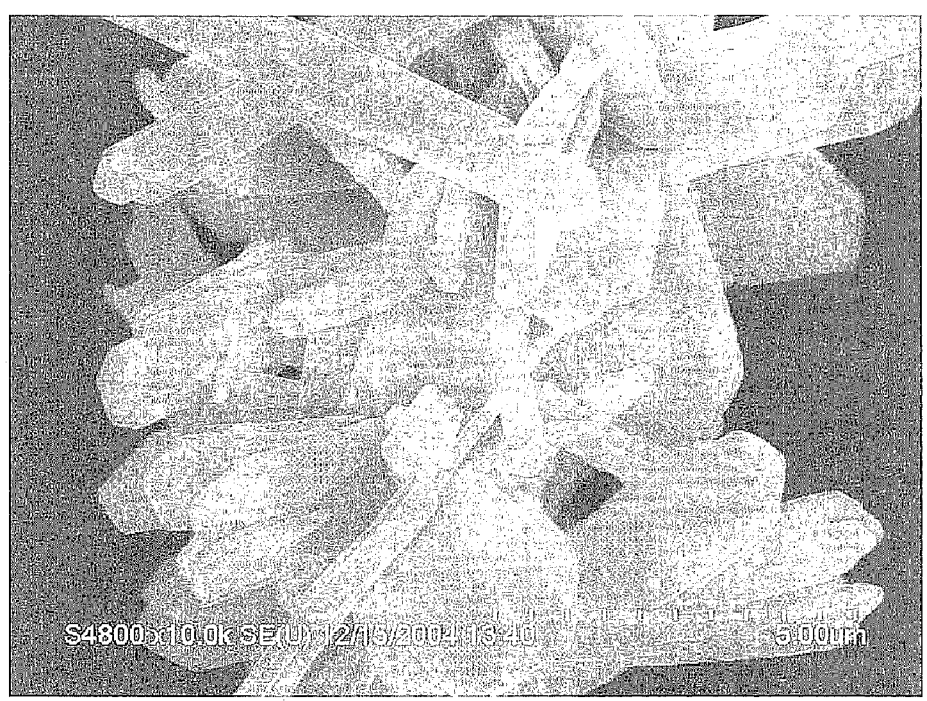
FIG. 4 is a photographic view of the cerium carbonate obtained from Example 1, taken by SEM.

XRD and SEM analyses results on the prepared cerium carbonate are shown in FIGS. 2 and 4, and it can be seen that a lanthanite-(Ce) crystal structured cerium carbonate was prepared.

Figure 3:
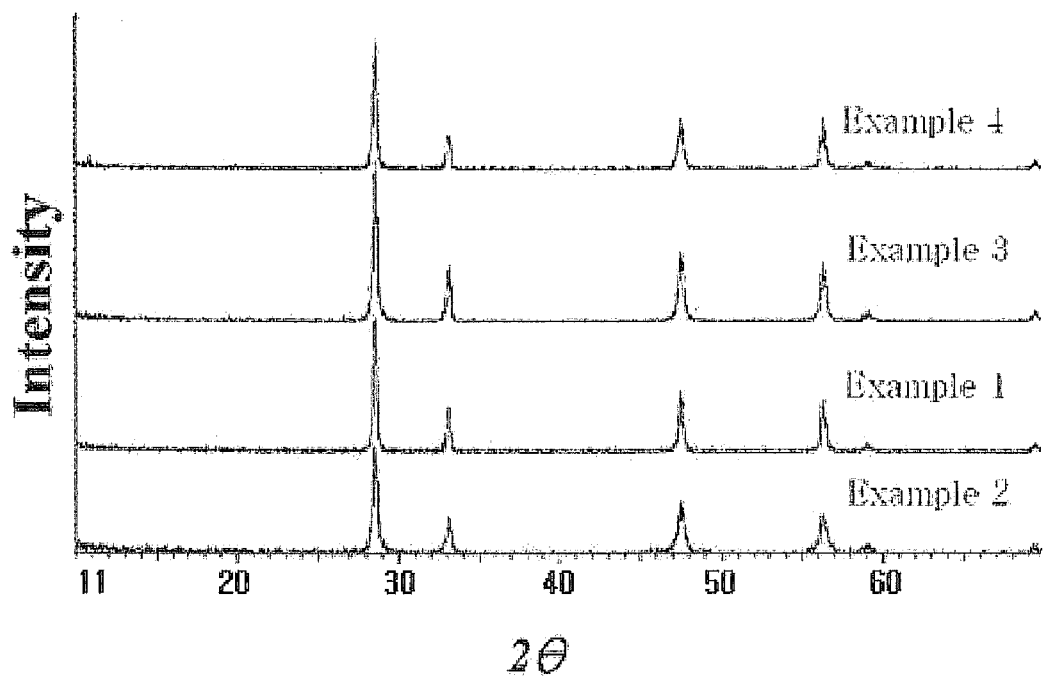
FIG. 3 is the X-ray diffraction (XRD) diagram of the cerium oxides obtained according to Examples 1, 5, and 7.

The cerium carbonate was heat-treated at 850° C. for 2 hours to obtain a cerium oxide. After analyzing the cerium oxide by XRD, it can be seen that a phase transition from the cerium carbonate into the cerium oxide was accomplished, as shown in FIG. 3.

EXAMPLE 2

A lanthanite-(Ce) crystal structured cerium carbonate and a cerium oxide were prepared in the same manner as described in Example 1, except that a cerium nitrate solution of 0.05M and an ammonium carbonate solution of 0.05M were used, instead of the cerium nitrate solution of 1.9M, and the ammonium carbonate solution of 2M.

Figure 5:
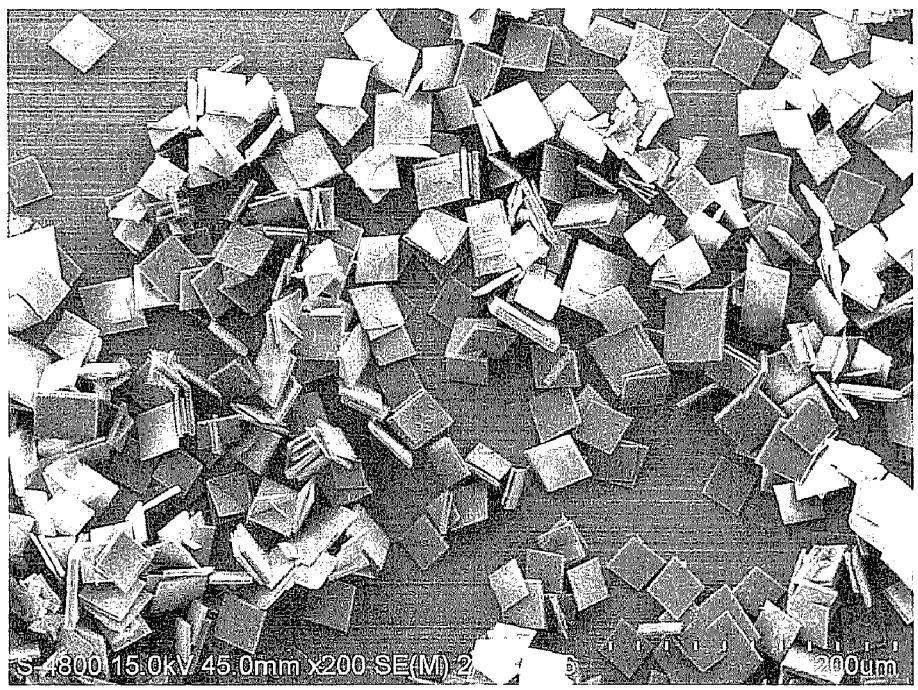
FIG. 5 is a photographic view of the cerium carbonate obtained from Example 2, taken by SEM.

An SEM analysis result on the prepared cerium carbonate is shown in FIG. 5.

EXAMPLE 3

A lanthanite-(Ce) crystal structured cerium carbonate and a cerium oxide were prepared in the same manner as described in Example 1, except that a cerium nitrate solution of 2.2M and an ammonium carbonate solution of 2.2M were used, instead of the cerium nitrate solution of 1.9M, and the ammonium carbonate solution of 2M.

EXAMPLE 4

A lanthanite-(Ce) crystal structured cerium carbonate and a cerium oxide were prepared in the same manner as described in Example 1, except that a cerium nitrate solution of 0.08M and an ammonium carbonate solution of 0.08M were used, instead of the cerium nitrate solution of 1.9M, and the ammonium carbonate solution of 2M.

EXAMPLE 5

A cerium carbonate and a cerium oxide were prepared in the same manner as described in Example 1, except that a precipitation reaction was carried out at 90° C., instead of 30° C., to obtain an orthorhombic crystal structured cerium carbonate.

Figure 6:
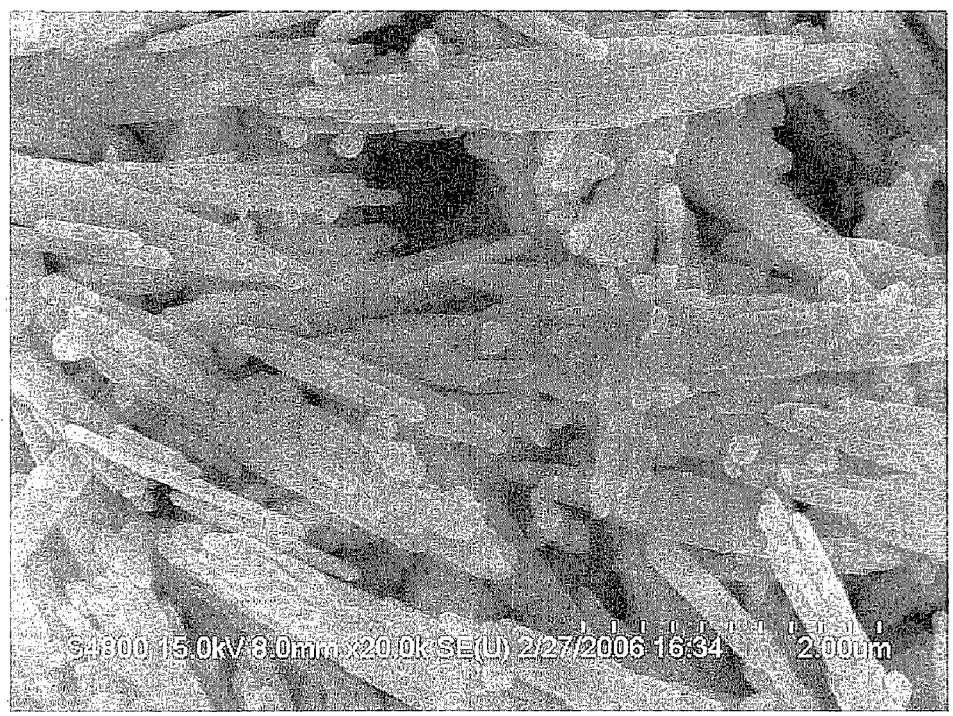
FIG. 6 is a photographic view of the cerium carbonate obtained from Example 5, taken by SEM.

An SEM analysis result on the prepared cerium carbonate is shown in FIG. 6.

EXAMPLE 6

A cerium carbonate and a cerium oxide were prepared in the same manner as described in Example 1, except that a cerium nitrate solution of 2.2M and an ammonium carbonate solution of 2.2M were used, instead of the cerium nitrate solution of 1.9M, and the ammonium carbonate solution of 2M, and a precipitation reaction was carried out at 80° C., instead of 30° C., to obtain an orthorhombic crystal structured cerium carbonate.

EXAMPLE 7

A cerium carbonate and a cerium oxide were prepared in the same manner as described in Example 1, except that a cerium nitrate solution of 0.05M and an ammonium carbonate solution of 0.05M were used, instead of the cerium nitrate solution of 1.9M, and the ammonium carbonate solution of 2M, and a precipitation reaction was carried out at 90° C., instead of 30° C., to obtain a hexagonal crystal structured cerium carbonate.

Figure 7:
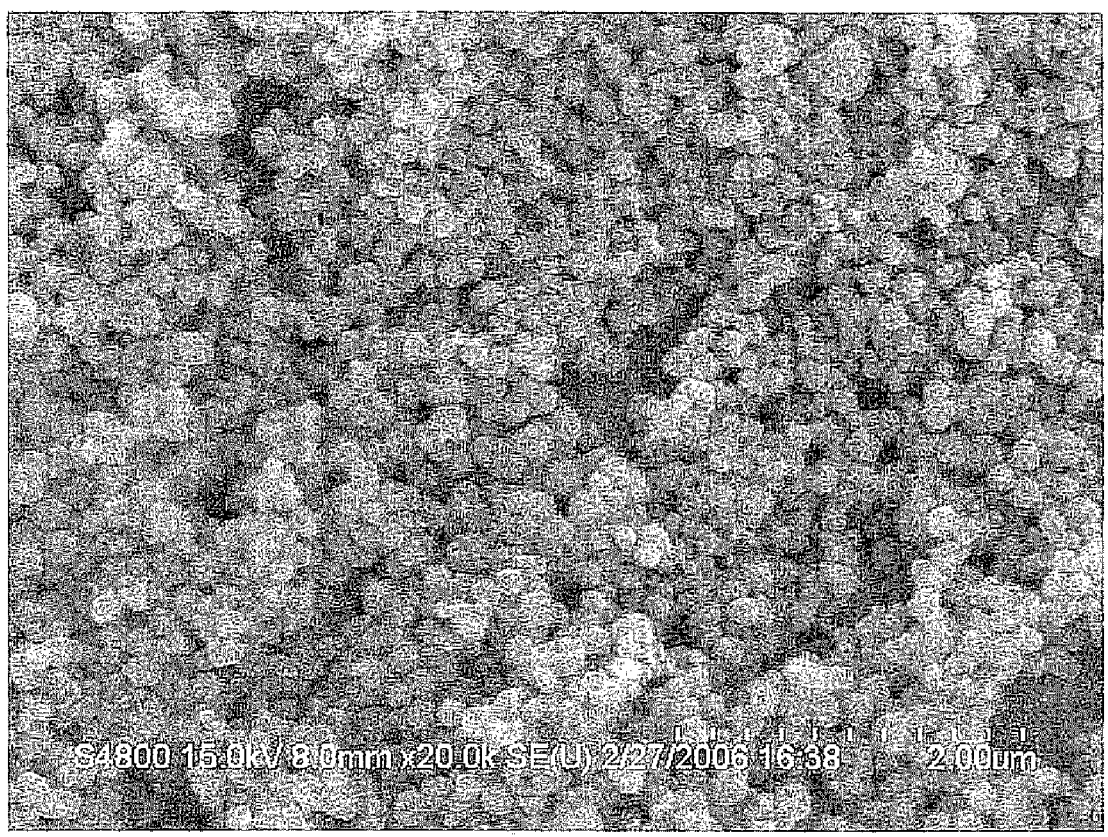
FIG. 7 is a photographic view of the cerium carbonate obtained from Example 7, taken by SEM.

An SEM analysis result on the prepared cerium carbonate is shown in FIG. 7.

EXAMPLE 8

A cerium carbonate and a cerium oxide were prepared in the same manner as described in Example 1, except that a cerium nitrate solution of 0.08M and an ammonium carbonate solution of 0.08M were used, instead of the cerium nitrate solution of 1.9M, and the ammonium carbonate solution of 2M, and a precipitation reaction was carried out at 90° C., instead of 30° C., to obtain a hexagonal crystal structured cerium carbonate.

Preparation of CMP Slurry

EXAMPLE 9

Cerium oxide powder for an abrasive in which the cerium oxide prepared from Example 1 and the cerium oxide prepared from Example 5 are present in a weight ratio of 4:1 was prepared, and a cerium oxide dispersion was prepared by using 0.5 kg of the cerium oxide powder for the abrasive, 25 g of a dispersant (polyacrylic acid available from Aldrich) and 5 L of pure water. The cerium oxide dispersion was titrated to pH 7.0 with aqueous ammonia, and subjected to a dispersion stabilization and particle size modification step using a ball mill. Herein, 100 g of zirconia beads with a size of 1 mm were used in the ball mill and the ball mill was operated at a speed of 250 rpm for 2 hours.

The dispersion was filtered with a 1 µm filter, and pure water was added thereto so that the content of the cerium oxide powder for the abrasive is 1 part by weight per 100 parts by weight of the total slurry to provide CMP slurry. The cerium oxide had an average particle diameter of 180 nm and a particle size distribution of about 70~300 nm, as measured by using a particle size distribution measuring system (Horiba LA-910).

EXAMPLE 10

CMP slurry was provided in the same manner as described in Example 9, except that instead of the cerium oxide powder for the abrasive of Example 9, cerium oxide powder for an abrasive in which the cerium oxide prepared from Example 1 and the cerium oxide prepared from Example 7 are present in a weight ratio of 1:4 was used.

EXAMPLE 11

CMP slurry was provided in the same manner as described in Example 9, except that instead of the cerium oxide powder for the abrasive of Example 9, cerium oxide powder for an abrasive in which the cerium oxide prepared from Example 5 and the cerium oxide prepared from Example 7 are present in a weight ratio of 1:9 was used.

COMPARATIVE EXAMPLE 1

CMP slurry was provided in the same manner as described in Example 9, except that instead of the cerium oxide powder for the abrasive of Example 9, the cerium oxide prepared from Example 1 was solely used as an abrasive.

COMPARATIVE EXAMPLE 2

CMP slurry was provided in the same manner as described in Example 9, except that instead of the cerium oxide powder for the abrasive of Example 9, the cerium oxide prepared from Example 2 was solely used as an abrasive.

COMPARATIVE EXAMPLE 3

CMP slurry was provided in the same manner as described in Example 9, except that instead of the cerium oxide powder for the abrasive of Example 9, the cerium oxide prepared from Example 5 was solely used as an abrasive.

COMPARATIVE EXAMPLE 4

CMP slurry was provided in the same manner as described in Example 9, except that instead of the cerium oxide powder for the abrasive of Example 9, the cerium oxide prepared from Example 5 was solely used as an abrasive.

EXPERIMENTAL EXAMPLE 1

Determination of Polishing Quality

The CMP slurry according to Examples 9~11 and Comparative Examples 1~4 was used in a polishing step for 1 minute under the following conditions. The substrate was washed thoroughly to measure the variation in the thickness after the polishing and to evaluate the polishing quality. The results are shown in the following Table 1.

[Polishing Conditions]

Polishing system: GNP POLY 400 (GNP Technology)

Polishing pad: polyurethane pad

Platen speed: 90 rpm

Carrier speed: 90 rpm

Pressure: 4 psi

Slurry flow rate: 100 ml/min.

[Objects to be Polished]

A silicon oxide ($SiO_2$) wafer on which a $SiO_2$ layer is deposited to 7000 Å from PECVD (plasma-enhanced chemical vapor deposition)

A silicon nitride (SiN) wafer on which a SiN layer is deposited to 1500 Å from LPCVD (low pressure chemical vapor deposition)

[Evaluation]

The variation in the thickness of each layer after polishing was measured by using an optical thickness measuring system, i.e. Nanospec 6100 (Nanometrics Co.).

Delta uniformity (Delta Within Wafer Non-Uniformity) was calculated according to the Standard Deviation Uniformity (ASTM).

TABLE 1

| Item | Crystal structure of cerium carbonate | Polishing rate of silicon oxide layer (Å/min) | Polishing rate of silicon nitride layer (Å/min) | Polishing selectivity | (Delta WIWNU (%)) |
|---|---|---|---|---|---|
| Ex. 9 | Lanthanite-(Ce) & Orthorhombic | 4342 | 160 | 27 | 16.23 |
| Ex. 10 | Lanthanite-(Ce) & Hexagonal | 5362 | 145 | 37 | 4.22 |
| Ex. 11 | Orthorhombic & Hexagonal | 4806 | 153 | 31 | 5.14 |
| Comp. Ex. 1 | Lanthanite-(Ce) | 5427 | 142 | 38 | 15.13 |
| Comp. Ex. 2 | Lanthanite-(Ce) | 5233 | 134 | 39 | 14.60 |
| Comp. Ex. 3 | Orthorhombic | 3983 | 192 | 21 | 16.87 |
| Comp. Ex. 4 | Hexagonal | 4471 | 131 | 35 | 4.42 |

According to the above experimental results, CMP slurry according to Comparative Examples 1 and 2, in each of which a cerium oxide prepared by using a lanthanite-(Ce) crystal structured cerium carbonate is solely used as an abrasive, showed the highest quality in the polishing rate of a silicon oxide layer, and CMP slurry according to Comparative Example 3, in which a cerium oxide prepared by using an orthorhombic crystal structured cerium carbonate is solely used as an abrasive, showed the highest quality in the polishing rate of a silicon nitride layer.

Also, CMP slurry according to Comparative Example 4, in which a cerium oxide prepared by using a hexagonal crystal structured cerium carbonate is solely used as an abrasive, showed relatively low polishing rates of a silicon oxide layer and a silicon nitride layer, but showed excellent polishing selectivity between the silicon oxide layer and the silicon nitride layer, as well as very excellent quality in delta WIWNU.

Accordingly, it was determined that cerium oxides prepared by using cerium carbonates having different crystal structures have different physical properties of shapes, strength, etc., and thus CMP slurry including the cerium oxides as abrasives showed different polishing qualities.

Meanwhile, CMP slurry according to Example 9, in which a cerium oxide prepared by using a lanthanite-(Ce) crystal structured cerium carbonate and a cerium oxide prepared by using an orthorhombic crystal structured cerium carbonate are used as an abrasive, showed a higher polishing rate of a silicon oxide layer and higher polishing selectivity as compared to the CMP slurry of Comparative Example 3.

Also, CMP slurry according to Example 10, in which a cerium oxide prepared by using a lanthanite-(Ce) crystal structured cerium carbonate and a cerium oxide prepared by using a hexagonal crystal structured cerium carbonate are used as an abrasive, showed similar property values (the polishing rate of a silicon oxide layer, the polishing rate of a silicon nitride layer, and polishing selectivity between the silicon oxide layer and the silicon nitride layer) to Comparative Example 1, as well as excellent WIWNU as compared to Comparative EXAMPLE 1.

Also, CMP slurry according to Example 11, in which a cerium oxide prepared by using an orthorhombic crystal structured cerium carbonate and a cerium oxide prepared by using a hexagonal crystal structured cerium carbonate are used as an abrasive, showed similar property values (polishing selectivity between a silicon oxide layer and a silicon nitride layer, and WIWNU) to Comparative Example 4, as well as improved polishing rates of the silicon oxide layer and the silicon nitride layer as compared to Comparative Example 4.

Therefore, it was determined that when at least two kinds of cerium oxides selected from the group including (i) a cerium oxide prepared by using a lanthanite-(Ce) crystal structured cerium carbonate; (ii) a cerium oxide prepared by using an orthorhombic crystal structured cerium carbonate; and (iii) a cerium oxide prepared by using a hexagonal crystal structured cerium carbonate are used as an abrasive for CMP slurry, it is possible to adjust at least one from among polishing properties, such as the polishing rate of a silicon oxide layer, the polishing rate of a silicon nitride layer, the polishing selectivity between the silicon oxide layer and the silicon nitride layer, and WIWNU, thereby improving the polishing quality of the CMP slurry.

Industrial Applicability

As can be seen from the foregoing, in the present invention, based on the fact that in a cerium oxide for an abrasive, the kind of improved polishing property depends on the crystal structure of a cerium carbonate (which is a source material), at least two kinds of cerium oxides selected from the group including (i) a cerium oxide prepared by using a lanthanite-(Ce) crystal structured cerium carbonate; (ii) a cerium oxide prepared by using an orthorhombic crystal structured cerium carbonate; and (iii) a cerium oxide prepared by using a hexagonal crystal structured cerium carbonate are used as an abrasive for CMP slurry, and the mixing ratio of the cerium oxides is adjusted, thereby adjusting at least one from among polishing properties, such as the polishing rate of a silicon oxide layer, the polishing rate of a silicon nitride layer, polishing selectivity between the silicon oxide layer and the silicon nitride layer, and within-wafer non-uniformity (WIWNU).

Also, in the present invention, the planarization degree of a wafer in semiconductor fabrication may be improved, thereby improving reliability and productivity of a device. Furthermore, the present invention may be utilized for improving integration density of a micro-sized semiconductor device.

The invention claimed is:

1. A Chemical-Mechanical Polishing (CMP) slurry comprising cerium oxide powder, wherein the cerium oxide powder comprises (i) cerium oxide prepared from cerium carbonate having a lanthanite-(Ce) crystal structure in an amount of 50 parts or more and less than 100 parts by weight per 100 parts by weight of cerium oxide powder, and at least one more kind of cerium oxide selected from the group consisting of (ii) cerium oxide prepared from cerium carbonate having orthorhombic crystal structure, and (iii) cerium oxide prepared from cerium carbonate having a hexagonal crystal structure as an abrasive.

2. The CMP slurry as claimed in claim 1, wherein the cerium oxide powder comprises the (ii) cerium oxide in an amount of 50 parts or more and less than 100 parts by weight per 100 parts by weight of the cerium oxide powder.

3. The CMP slurry as claimed in claim 1, wherein the cerium oxide powder comprises the (iii) cerium oxide in an amount of 50 parts or more and less than 100 parts by weight per 100 parts by weight of the cerium oxide powder.

4. The CMP slurry as claimed in claim 1, comprising the abrasive in an amount of 0.5 to 50 parts by weight per 100 parts by weight of the slurry, a dispersant in an amount of 0.5 to 10 parts by weight per 100 parts by weight of the cerium oxide powder, and water.

5. A shallow trench isolation (STI) process comprising:
   a) providing the CMP slurry as claimed in claim 1, and
   b) polishing a substrate with the CMP slurry wherein the polishing step is a shallow trench isolation technique.

6. A method for chemical-mechanical polishing (CMP), comprising
   a) providing the CMP slurry of claim 1 as the abrasive, and
   b) increasing a content of the cerium oxide prepared from the cerium carbonate having the lanthanite-(Ce) crystal structure in the abrasive to increase the polishing rate of the silicon oxide layer, and
   c) polishing a substrate with the CMP slurry wherein the polishing step is a chemical-mechanical polishing technique.

7. A method for chemical-mechanical polishing (CMP), comprising
   a) providing the CMP slurry of claim 1 as an abrasive, and
   b) increasing a content of the cerium oxide prepared from the cerium carbonate having the orthorhombic crystal structure in the abrasive to increase the polishing rate of the silicon nitride layer, and
   c) polishing a substrate with the CMP slurry wherein the polishing step is a chemical-mechanical polishing technique.

8. A method for chemical-mechanical polishing (CMP), comprising a) providing the CMP slurry of claim 1 as an abrasive, and b) increasing a content of the cerium oxide prepared from the cerium carbonate having the hexagonal crystal structure in the abrasive to increase at least one property selected from the group consisting of the polishing selectivity between the silicon oxide layer and the silicon nitride layer and the within-wafer non-unifromity, and c) polishing a substrate with the CMP slurry wherein the polishing step is a chemical-mechanical polishing technique.

* * * * *